United States Patent [19]

Ra et al.

[11] Patent Number: 5,326,334
[45] Date of Patent: * Jul. 5, 1994

[54] CONTINUOUSLY ENGAGED GEARED AUTOMATIC TRANSMISSION WITH CONTROLLING BRAKES

[76] Inventors: Jong O. Ra, 24/1,265-154 Bokwang-Dong, Yongsan-Gu, Seoul; Joon Y. Lim, Duckyong Villa Ka-204, 141-2, Duckjeong-Ri, Hoccheon-Uep, Yangju-Gun, Kyungki-Do, both of Rep. of Korea

[*] Notice: The portion of the term of this patent subsequent to Jun. 21, 2011 has been disclaimed.

[21] Appl. No.: 903,137

[22] Filed: Jun. 23, 1992

[30] Foreign Application Priority Data

Jun. 26, 1991 [KR] Rep. of Korea .................. 91-10947

[51] Int. Cl.⁵ ............................................ F16H 37/06
[52] U.S. Cl. ................................. 475/330; 475/150; 475/317
[58] Field of Search .................... 475/1, 2, 150, 280, 475/311, 317, 330

[56] References Cited

U.S. PATENT DOCUMENTS

| | | | |
|---|---|---|---|
| 4,010,653 | 3/1977 | Mekjian | 475/311 OR |
| 4,027,552 | 6/1977 | Murakami et al. | 475/280 X |
| 5,062,823 | 11/1991 | Ra et al. | 475/330 |
| 5,141,477 | 8/1992 | Oshidari | 475/280 X |

FOREIGN PATENT DOCUMENTS 1415523 11/1975 United Kingdom .
2160598 12/1985 United Kingdom .

OTHER PUBLICATIONS

08/028,824 Mar. 10, 1993 Jonh-Oh Ra et al., (Claims-pp. 36-45).
08/028,824 Mar. 10, 1993 Jonh-Oh Ra et al., (Drawings-15 sheets).

*Primary Examiner*—Leslie A. Braun
*Assistant Examiner*—Daniel Wittels
*Attorney, Agent, or Firm*—Merchant, Gould, Smith, Edell, Welter & Schmidt

[57] ABSTRACT

An automatic variable speed transmission with an input shaft, an input sun gear formed on the input shaft and a first and second carrier rotatably mounted on the input shaft with the second carrier terminating in an output shaft. First and second locking pins secure and interconnect the two carriers together to enable simultaneous rotation of the carriers. A low speed ring gear is rotatably mounted on the input shaft. A first differential gear is rotatably mounted on each first locking pin and each first differential gear is in mechanical communication with the input sun gear and the low speed ring gear. A reverse ring gear is rotatably mounted on the output shaft. A second differential gear is rotatably mounted on each second locking pin and each second differential gear is in mechanical communication with the reverse rotation ring gear and with a first differential gear. A low speed brake inhibits rotation of the low speed ring gear sufficient to stop the low speed ring gear from rotation causing the output shaft to rotate at a low speed. A reverse rotation brake inhibits rotation of the reverse rotation ring gear sufficient to stop the reverse rotation ring gear from rotation causing the output shaft to rotate in a direction opposite to that of the input shaft. An interlocking device locks the input shaft and the low speed ring gear together causing the output shaft and input shaft to rotate at the same speed.

18 Claims, 11 Drawing Sheets

CONTINUOUSLY ENGAGED GEARED AUTOMATIC TRANSMISSION WITH CONTROLLING BRAKES

BACKGROUND OF INVENTION

1. Field of the Invention

This invention relates to a transmission, and more particularly to a continuous automatic transmission which converts rotational input power into rotational output power which corresponds to a load of an output shaft and which obviates the need to change or disengage gears to vary rotational output. In addition a clutch which engages and disengages the rotational output from a motor is not needed for changing gears.

2. Information Disclosure Statement

A transmission changes speed by either automatic or manual selection of a predetermined gear ratio. Present day transmissions require large installation space because of their design and complicated structure. Further, a clutch is required for use with a manual transmission to disengage or engage the rotational power from the engine so that gears can be changed or disengaged when changing speeds to comply with the load on the output shaft. Also, shifting the gears and the operation of the clutch must be synchronized to properly effect the gear change.

To solve the above described problems U.S. Pat. No. 5,062,823 entitled: Continuously Variable Transmission With Controlling Brakes, issued to the present applicants on Nov. 5, 1991. However, the transmission described in the above patent document requires a separate means for attaining reverse operation, i.e. a backward motion.

Therefore, it is an object of the present invention to provide a continuous variable automatic transmission which solves all the problems of the prior art transmissions and which can rapidly comply with a change of the load without the need of a clutch to disengage the engine output when changing the gears.

A further object of the present invention is to provide a continuous variable automatic transmission which efficiently transmits rotational output in either rotational direction and which is simple to construct and easy to maintain.

A further object of the present invention is to provide a continuous variable automatic transmission which the rotational power generated by the engine can be varied to effect a neutral, low speed, medium speed, high speed or reverse speed and transmitted to the output shaft without disengaging or changing a gear or utilizing a clutch. The operation of the transmission according to the present is very convenient due to its simple structure, small installation space and low production cost.

The preceding objects should be construed as merely presenting the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description, below, which describe the preferred embodiment in addition to the scope of the invention defined by the claims considered in conjunction with the accompanying drawings.

SUMMARY OF THE INVENTION

The continuous automatically variable transmission of the present invention is defined by the claims with a specific embodiment shown in the attached drawings. For the purpose of summarizing the invention, the invention relates to a first embodiment of an automatic transmission 10 which comprises an input shaft 12 having a first section 12A and a second section 12B for receiving rotational driving force. An input sun gear 14 is mounted on the input shaft 12 proximate the second section 12B of the input shaft 12. A hollow control shaft 16 with a first end 16A and a second end 16B is coaxially and rotatably positioned on the input shaft 12. The hollow control shaft rotates independently of the input shaft. A sun gear 18 is positioned at the first end 16A of the control shaft 16. A first carrier 22 is coaxially and rotatably mounted on the control shaft 16 proximate the sun gear 18. A second carrier 28 is coaxially and rotatably mounted on the input shaft with the second carrier 28 and terminates in an output shaft 30. A plurality of first locking pins 32A and a plurality of second locking pins 32B with each locking pin secured to and interconnecting the first and second carriers 22, 28, respectively, to enable the carriers 22, 28 to simultaneously rotate about the hollow control shaft 16 and the input shaft 12, respectively. A low speed ring gear 46 is rotatably mounted on the output shaft 30. A plurality of first differential gears 36 are used with each first differential gear being rotatably mounted on a first locking pin 32AA of the plurality of first locking pins 32A, respectively, and each first differential gear 36A is in mechanical communication with the input sun gear 14 and the low speed ring gear 46. A reverse rotation ring gear 52 is rotatably mounted on the hollow control shaft 16. A plurality of second differential gears 42 with each second differential gear 42A rotatably mounted on a second locking pin 32BB of the plurality of second locking pins 32B, respectively, and with each second differential gear 42A being in mechanical communication with the reverse rotation ring gear 52, the sun gear 18 and with a first differential gear of the plurality of first differential gears. A low speed brake means 60 applies rotational resistance to the low speed ring gear 46 sufficient to stop the rotation of the low speed ring gear 46 such that the output shaft 30 rotates at a low speed. A medium speed brake means 62 applies rotational resistance to the control shaft 16 sufficient to stop the rotation of the control shaft 16 such that the output shaft 30 rotates at a medium speed. An interlocking means 66 locks together the input shaft 12 and the hollow control shaft 16 to enable the output shaft and the input shaft rotate at the same speed. The interlocking means 66 is used to attain rotational high speed of the output shaft after the medium speed has been reached. The interlocking means 66 includes a friction clutch device which can slowly engage the rotating input shaft and the rotating low speed ring gear 146 and thereby slowly increase the rotational speed of the output shaft 30 over the medium speed. Other interlocking means 66 include friction drive, belt drive, and such means well known in the art.

Preferably, the automatic transmission 10 of the first embodiment further includes a reverse rotation brake means 64 for applying rotational resistance to the reverse rotation ring gear 52 sufficient to stop the rotation of the reverse rotation ring gear 52 such that the output shaft rotates in a rotational direction opposite to that of the input shaft.

The low speed brake means 60 of the first embodiment preferably provides upon activation, a gradual application of rotational resistance to the low speed ring gear 46 sufficient to initiate rotation of the output shaft 30 and upon further activation of the low speed brake means 60 the rotational resistance on the low speed ring gear is increased such that the low speed ring gear stops rotating and the output shaft 30 rotates at the low speed.

The second embodiment of the present invention includes an automatically variable transmission 10 which comprises an input shaft 12 for receiving rotational driving force and an input sun gear 114 mounted on the input shaft 12. A first carrier 22 is coaxially and rotatably mounted on the input shaft 12. A second carrier 28 is coaxially and rotatably mounted on the input shaft with the second carrier 28 terminating in an output shaft 30. A plurality of first locking pins 132A and a plurality of second locking pins 132B are used with each locking pin secured to and interconnecting the first and second carriers 22, 28, respectively. This enables the first and second carriers 22, 28 to simultaneously rotate about the input shaft 12. A low speed ring gear 146 is rotatably mounted on the input shaft 12. A plurality of first differential gears 136 is used with each first differential gear 136A being rotatably mounted on a first locking pin 132AA of the plurality of first locking pins 132A and with each first differential gear 136A being in mechanical communication with the input sun gear 114 and the low speed ring gear 146. A reverse rotation ring gear 152 is rotatably mounted on the output shaft 30. A plurality of second differential gears 142 is used with each second differential gear 142A being rotatably mounted on a second locking pin 132BB of the plurality of second locking pins 132B and with each the second differential gear 142A being in mechanical communication with the reverse rotation ring gear 152 and with a first differential gear 136A of the plurality of first differential gears 136. A low speed brake means 160 is used to apply in use rotational resistance to the low speed ring gear 146 sufficient to stop the rotation of the low speed ring gear 146 such that the output shaft 30 rotates at a low rotational speed relative to the rotational speed of the input shaft. A reverse rotation brake means 164 are used to apply in use rotational resistance to the reverse rotation ring gear 152 sufficient to stop the rotation of the reverse rotation ring gear 152 such that the output shaft rotates in a rotational direction opposite to that of the input shaft. Interlocking means 66 lock the input shaft 12 and the low speed ring gear 146 together to enable in use the output shaft and the input shaft rotate at the same rotational speed. The interlocking means 66 includes a friction clutch device which can slowly engage the rotating input shaft and the rotating low speed ring gear 146 and thereby slowly increase the rotational speed of the output shaft 30 to a medium speed. Other interlocking means 66 include friction drive, belt drive, and other such devices which are well known in the art.

Also, in the second embodiment, the low speed brake means 160 preferably provides in use, upon activation, a gradual application of rotational resistance to the low speed ring gear 146 sufficient to initiate rotation of the output shaft 30 and upon further activation of the low speed brake means 160, rotational resistance on the low speed ring gear is further increased such that the low speed ring gear stops rotating and the output shaft 30 rotates at a low rotational speed relative to the input shaft 12.

In the first and second embodiments each differential gear (36A, 42A and 136A, 142A, respectively) includes a forward portion and a rear portion with the forward portion having a predetermined number of teeth formed thereon and the rear portion having a predetermined number of teeth formed thereon. The number of teeth formed in the forward portion of each of the differential gears (36A, 42A and 136A, 142A) is either different or equal to the number of teeth formed in the rear portion of each the differential gear (36, 42 and 136, 142).

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be had to the following detailed description taken in conjunction with the accompanying drawings in which:

FIG. 1 is a partial perspective view of the first embodiment;

FIG. 2 is an assembled sectional view of the first embodiment of the present invention;

FIG. 3 is a sectional view showing the continuous automatic transmission according to the present invention in the neutral state;

FIG. 4 is a sectional view showing the continuous automatic transmission according to the present invention in the low speed state;

FIG. 5 is a sectional view showing the continuous automatic transmission according to the present invention in the medium speed state;

FIG. 6 is a sectional view showing the continuous automatic transmission according to the present invention in the high speed state;

FIG. 7 is a sectional view showing the continuous automatic transmission according to the present invention in the reverse speed state;

FIG. 8 is an assembled sectional view of the second embodiment according to the present invention;

FIG. 9 is a sectional view showing the neutral state;

FIG. 10 is a sectional view showing the forward driving state; and

FIG. 11 is a sectional view showing the reverse driving state.

Similar reference characters refer to similar parts throughout the several views of the drawings.

DETAILED DESCRIPTION OF THE INVENTION

Figure 1:
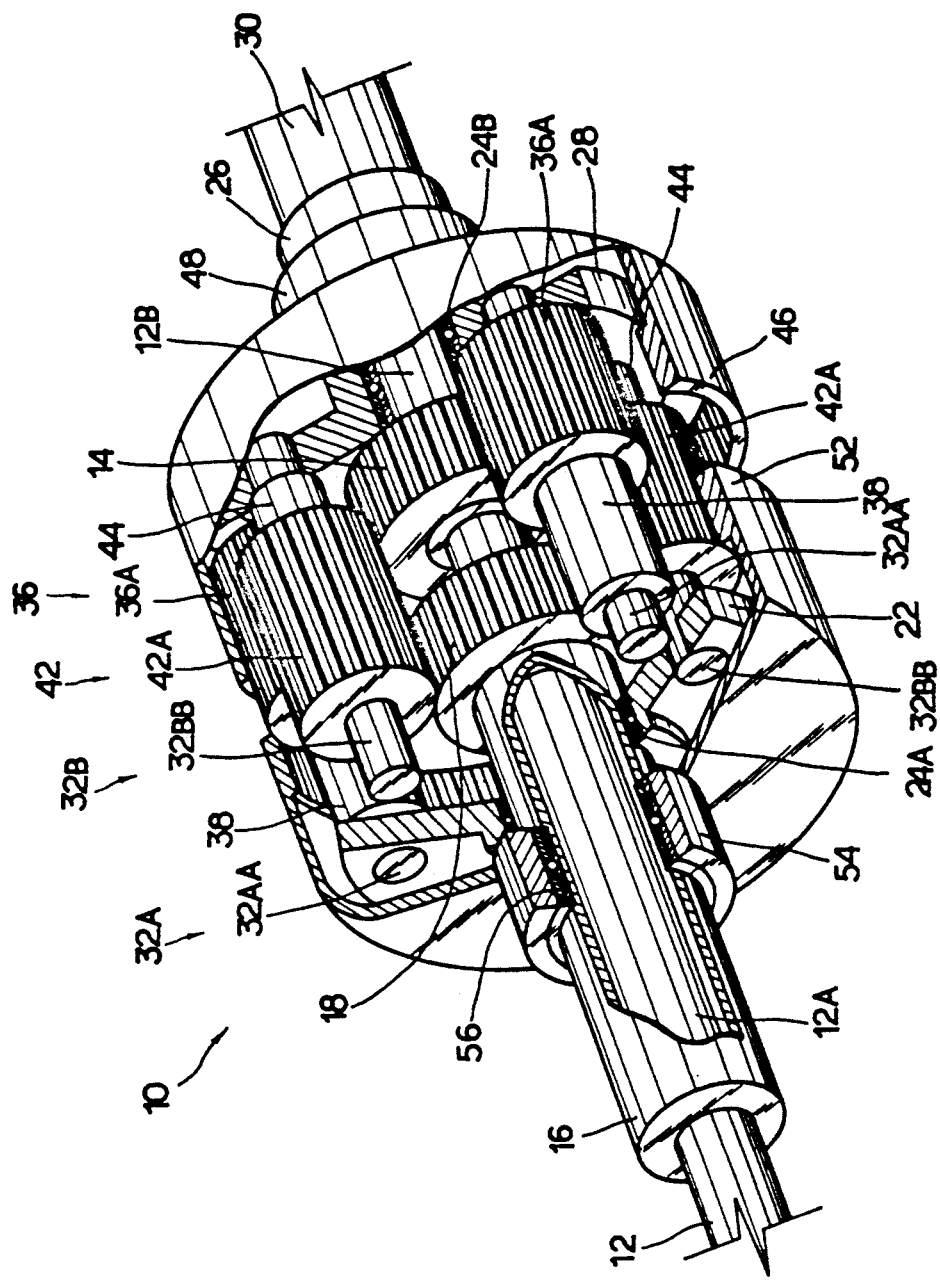
FIGS. 1-7 illustrate the first embodiment of the continuous automatic transmission according to the present invention.
Figure 2:
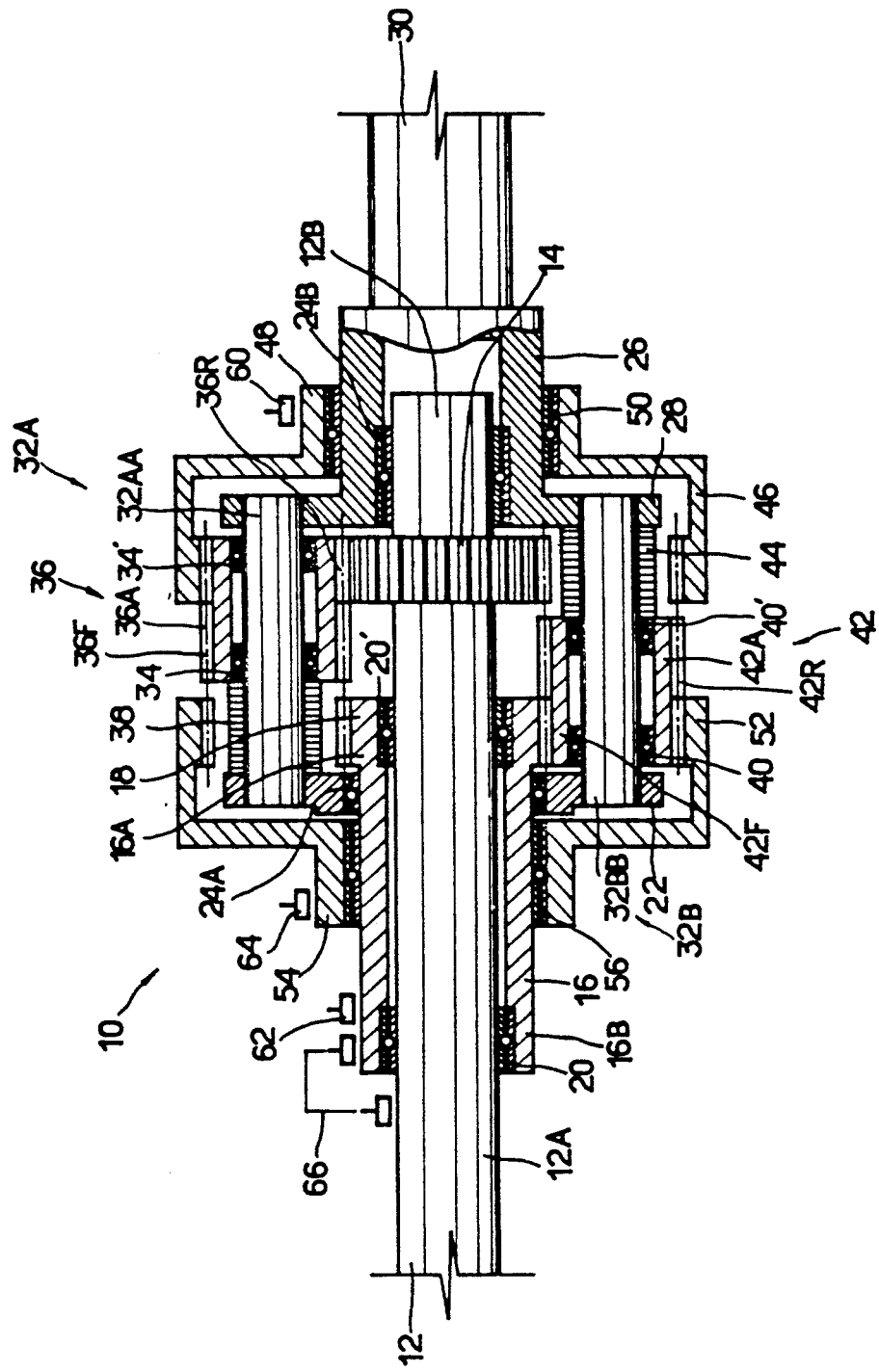

The continuous automatic transmission 10 of the first embodiment of the present invention, as shown in FIG. 1 and FIG. 2, includes an input shaft 12 to which a driving force is input from the drive shaft of an engine. The input shaft 12 consists of a first section 12A and a second section 12B. The input sun gear 14 is integrally formed with the input shaft 12 between the first section 12A and the second section 12B. A hollow control shaft 16 of predetermined length is coaxially installed at the first section 12A of the input shaft 12. The sun gear 18 is integrally formed at end 16A of the control shaft 16. Bearings 20, 20' are installed such that the control shaft 16 and the input shaft 12 rotate independently. The disk type first carrier 22 is installed on the control shaft 16 near the sun gear 18 so as to rotate freely via a bearing 24A. A second carrier 28 having a hollow cylindrical part 26 is installed on the second section 12B of the input shaft so as to rotate freely via a bearing 24B. The second carrier 28 terminates in the output shaft 30.

A plurality of locking pins 32A, 32B interconnect and are secured to each of the first and second carriers 22, 28 so that the carriers 22, 28 rotate together about the input shaft 12 (See FIG. 1). Each first differential gear 36A of the plurality of first differential gears 36 is rotatably mounted onto a locking pin 32AA of the plurality of locking pins 32A near the second carrier 28 so as to rotate freely via bearings 34, 34'. Bushings 38 may be inserted onto the locking pins 32A to prevent axial movement of the first differential gear along the locking pin 32A, however, other such means may be used. Each second differential gear 42A, of the plurality of second differential gears 42, is rotatably mounted onto a locking pin 32BB near the first carrier 22 so as to rotate freely via bearings 40, 40'. Bushing 44 can may be inserted to prevent the axial movement of the second differential gear along the locking pin 32BB, however, other such means may be used.

Three "first" sets are preferably used in the transmission of the present invention with a set consisting of a locking pin 32AA, a first differential gear 36A and bearings 34, 34'. In like manner, three "second" sets are used with each set consisting of a locking pin 32BB, a second differential gear 42A and bearings 40, 40'. However, the number of such sets is not limited.

The rear portion 36R of each first differential gear 36A meshes with the input sun gear 14 and the low speed ring gear 46. The low speed ring gear 46 includes a tube shaft boss 48, and a bearing 50 inserted between the tube shaft boss 48 and the hollow cylindrical part 26 such that the low speed ring gear 46 rotates independently about the hollow cylindrical part 26.

The forward portion 36F of each first differential gear 36A meshes with the rear portion 42R of each second differential gear 42A. The forward portion 42F of the second differential gear 42A meshes with the sun gear 18 and the reverse rotation ring gear 52. The reverse rotation ring gear 52 has a tube shaft boss 54, and a bearing 56 inserted between the tube shaft boss 54 and the control shaft 16 such that the reverse rotation ring gear 52 rotates independently about the control shaft 16.

The brake means for applying a rotational braking force to the ring gears 46, 52, input shaft 12 and hollow control shaft 16 are used to perform an output shaft speed change for each step. First, a low speed brake means 60, which is installed on the tube shaft boss 48 of the low speed ring gear 46, applies brake force to the low speed ring gear 46 to initiate rotation of the output shaft and to achieve the low speed state. This force is then withdrawn and the medium speed brake means 62, which is installed on the control shaft 16, applies brake force to the sun gear 18 mounted on the control shaft 16 to achieve the medium speed state. To attain the high speed state, the input shaft 12 and the control shaft 16 are rotated as a unit, i.e. integrally, by means of activating the interlocking means 66 which locks the input shaft and the control shaft together so that they rotate as a unit. However, the interlocking means also enables the locking to progress slowly which will enable a difference between their respective rotational speeds. Such means 66 are known and include devices such as a hydraulic clutch, torque converter, electronic clutch, and the like. For the sake of brevity, a detailed description about such known devices is omitted.

A reverse rotation brake means 64, which is installed on the tube shaft boss 54 of the reverse rotation ring gear 52, applies brake force to the reverse rotation ring gear 52 to achieve a reversal of the rotation of the output shaft relative to the input shaft.

Although the brake means as illustrated in the drawings are installed on the control shaft and/or the tube shaft boss, the actual positions of the brake means and the construction thereof can be changed. Furthermore, the above described low speed, medium speed, high speed interlinking means and reverse rotation brake means can use automatic control or manual control, and electric, electronic, hydraulic or friction wheel brake means. As illustrated the low speed ring gear 46 at the time of low speed, the control shaft 16 at the time of medium speed and the reverse rotation ring gear 52 at the time of reverse driving are braked by forcing a brake lining against the outer surface of the low speed ring gear 46, the control shaft 16 and the reverse rotation ring gear 52. This is a simple brake means, however, other brake means are well known in the art and would be expected to accomplish the braking purpose.

The continuous automatic transmission of the present invention can be used in any mechanism which utilizes rotational driving power such as an automobile and industrial machines. However, the following description is for an automobile.

In the figures the direction of rotation when viewed from the left side of each figure of the input shaft is counterclockwise, and such a direction is indicated as "↑".

Figure 3:
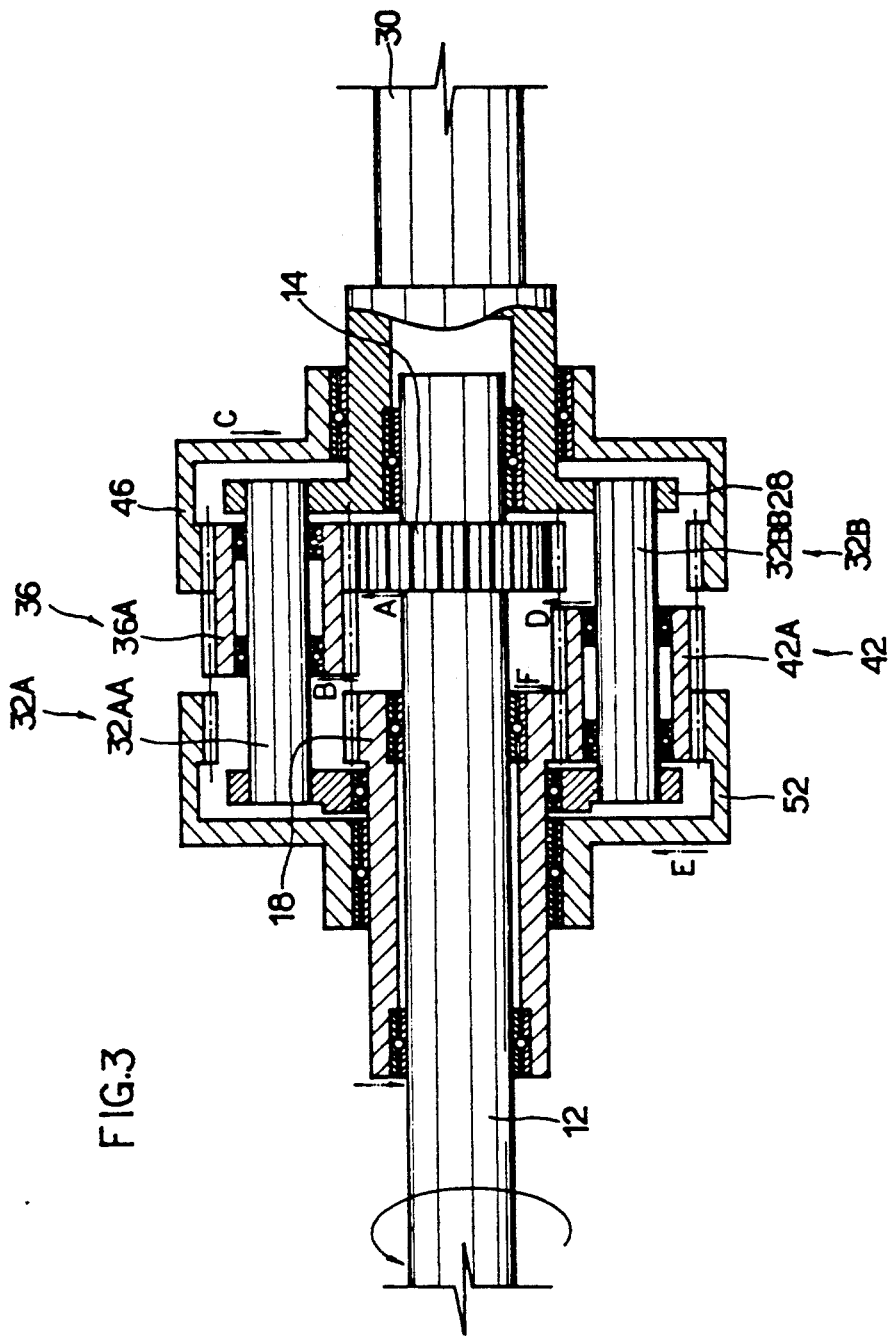

1. Neutral State (FIG. 3)

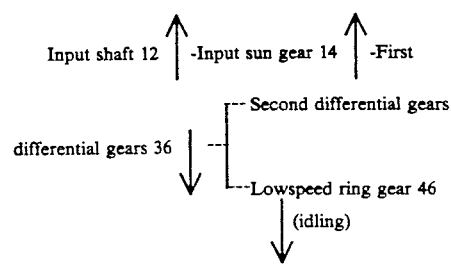

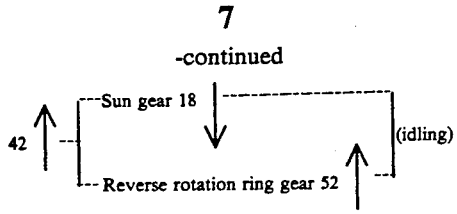

```
       ┌─Sun gear 18  │──────────┐
42 ↑ ─ │              ↓          │ (idling)
       │                       ↑ │
       └─ Reverse rotation ring gear 52  ↑ ─┘
```

The neutral state is a state in which the rotational driving force of the engine is not output to the output shaft 30, i.e. the output shaft "idles" or does not rotate, as shown in FIG. 3. Here the rotational force of the engine rotates the input shaft. The input sun gear 14, integrally formed on the input shaft 12, rotates in the same direction A, and according to the rotation of the input sun gear 14, the first differential gear 36A meshed with it rotates about the locking pin 32AA in a direction B opposite to the rotational direction of the input sun gear 14. At this time the first differential gear 36A only rotates about the locking pin 32AA due to the load (rotational resistance) on the second carrier 28 and the integrally formed output shaft 30, which therefore remain motionless. The low speed ring gear 46, which is meshed with the first differential gear 36A, rotates in a direction C opposite to the rotational direction of the input sun gear 14. The second differential gear 42A, which is meshed with the first differential gear 36A, only rotates about the locking pin 32BB in a direction D opposite to the rotational direction of the first differential gear 36A, the direction D being the same as the direction of the input sun gear 14. The reverse rotation ring gear 52, which meshes with the second differential gears 42, rotates in a direction E which is the same as that of the input sun gear 14. At this time the sun gear 18 rotates in direction F which is opposite to the rotational direction of the input sun gear 14, so that the input rotational force is rotationally dissipated within the transmission.

In the neutral state, because the output shaft 30 is loaded and stationary, the first and second differential gears, the sun gear 18, the low speed ring gear and the reverse rotation ring gear are idling, that is, the driving force input through the input shaft 12 is not transmitted to the output shaft 30 but is dissipated in the transmission by the movement of the transmission gear components.

Figure 4:
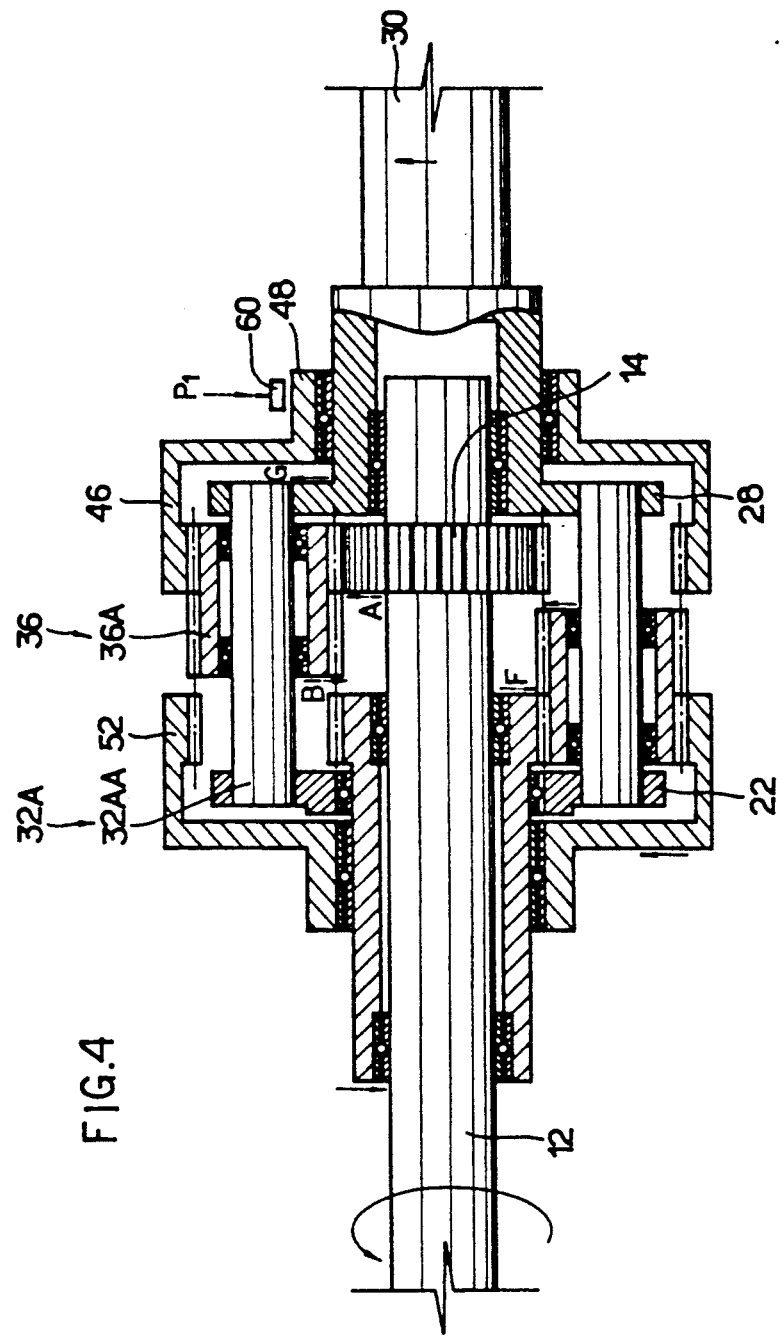

2. Low speed state (FIG. 4)

Input shaft 12 ↑ —input sun gear 14 ↑ —First differential gears 36 ↓ —carriers 22, 28 ↑ —Output shaft 30 ↑

The low speed state is a state in which the rotation of the output shaft 30 is initiated and gradually increased. In the above described neutral state, when the brake force P1 is applied by the low speed brake means 60, the rotational speed of the low speed ring gear 46, which was rotating in the direction C opposite to the rotation of the input shaft, decreases and eventually stops, causing the initiation of the rotation of the output shaft 30 as the rotation of the low speed ring gear 46 decreases and stops. That is, when the rotation of the low speed ring gear 46 decreases and stops, the first differential gears 36 revolve around the inside of the low speed ring gear 46 while, at the same time, rotating about their axis, the carriers 22, 28 rotate in a direction G and the output shaft 30 integrally formed with the second carrier 28, rotates.

Reviewing the rotational direction of each gear during the low speed state, the first differential gears 36 rotate in the direction B opposite to the direction A of the input sun gear 14. The first and second carriers 22, 28 and the output shaft 30 rotate in the direction G, which is the same as that of the input sun gear 14. The first differential gears 36 rotate about their axis on the locking pins 32A in the direction B, and also revolve around the inside of the low speed ring gear 46 together with the first and second carriers 22, 28 in the direction G.

Figure 5:
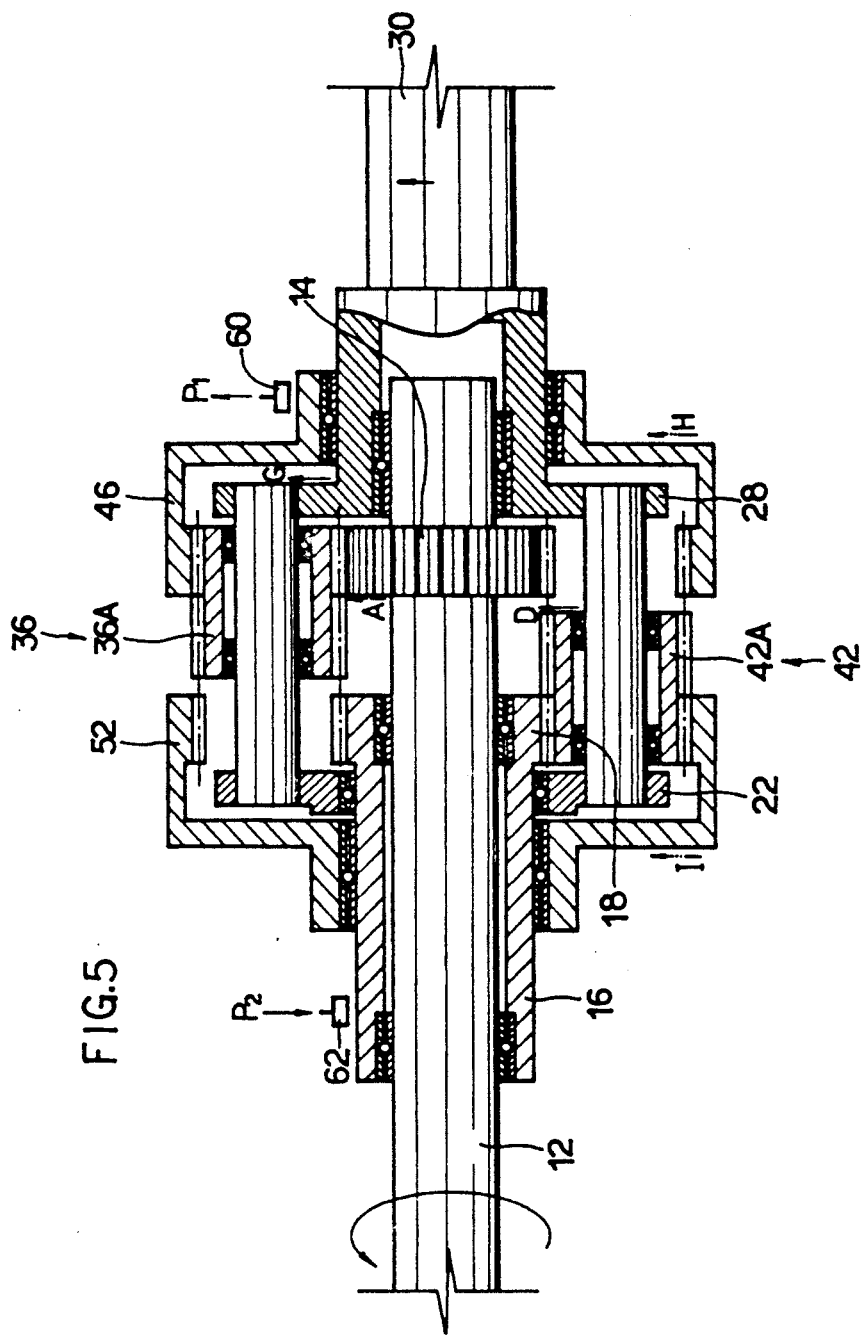

3. Medium speed state (FIG. 5)

Input shaft 12 ↑ —Input sun gear 14 ↑ —First differential gears 36—Second differential gears 42 ↑ —Carriers 22, 28 ↑ —Output shaft 30 ↑

The medium speed state increases the rotation of the output shaft 30 above the rotational speed of the low speed state. If in the low speed state, the brake force P1 applied to the low speed ring gear 46 is released and a brake force P2 is applied by the medium speed brake means 62 installed on the control shaft 16 to slow the rotational speed of the control shaft. The rotational force of the sun gear 18, integrally formed on the control shaft 16 which was rotating in the direction F and which is opposite to that of the input shaft, decreases and stops. That is, as the rotation of the sun gear 18 decreases and stops, the rotation of the second differential gears 42 about their axis decreases, and the second differential gears 42 revolve around the sun gear 18 and increase the rotation (G direction) of the first and second carriers 22, 28. Consequently, the rotation of the output shaft 30, integrally formed on the second carrier 28, increases. At this time the rotational direction of the output shaft is the same as that of the input sun gear 14.

Reviewing the rotational direction of each gear, the low speed ring gear 46 meshes with the first differential gears 36 and the reverse rotation ring gear 52 meshes with the outside of the second differential gears 42 and rotate in the direction H, I, respectively, which is the same as that of the input sun gear 14. As the sun gear 18, which is meshed with the inside of the second differential gears 42, comes to a stop, the rotational force of the carriers increases and the rotation of the first and second differential gears about their own axis decreases.

Figure 6:
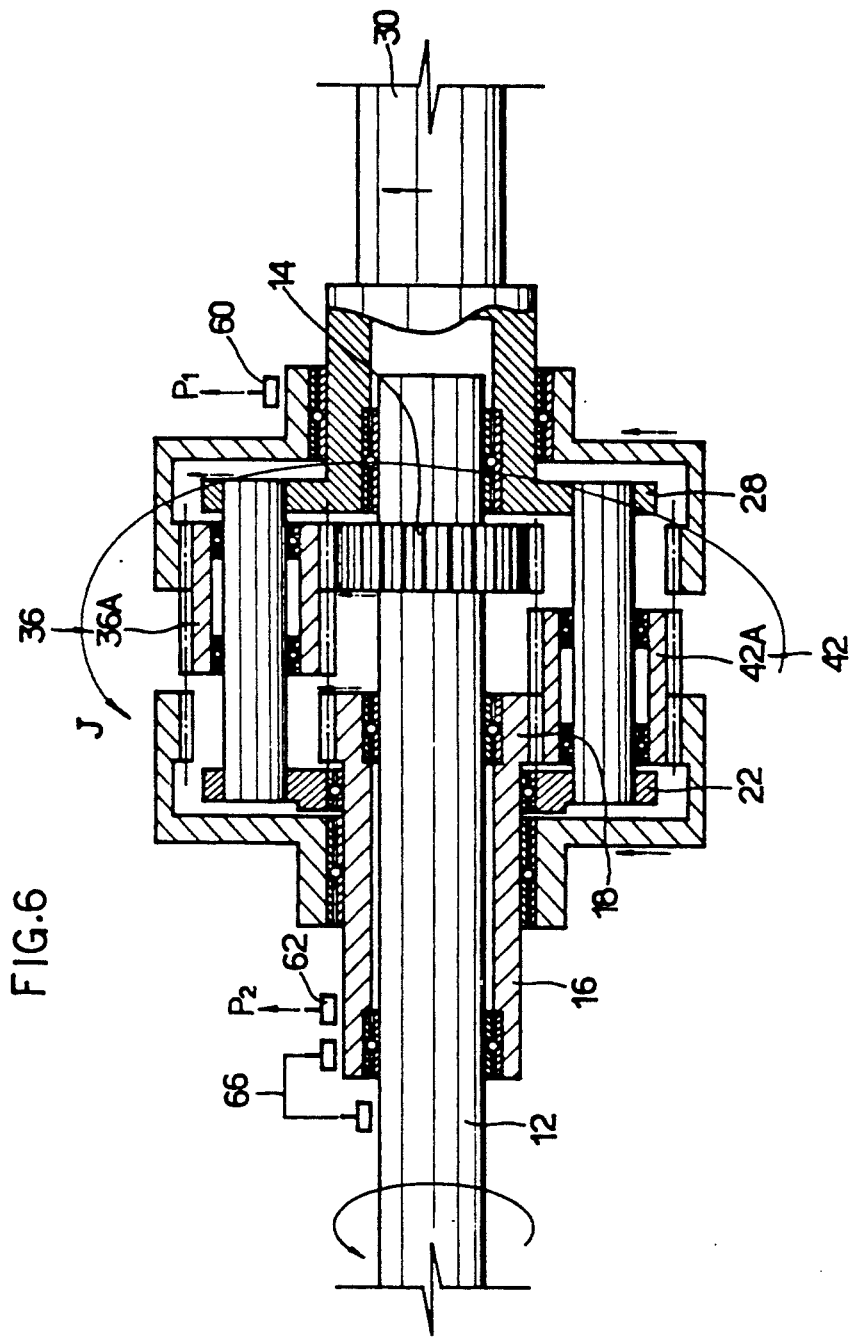

4. High speed state (FIG. 6)

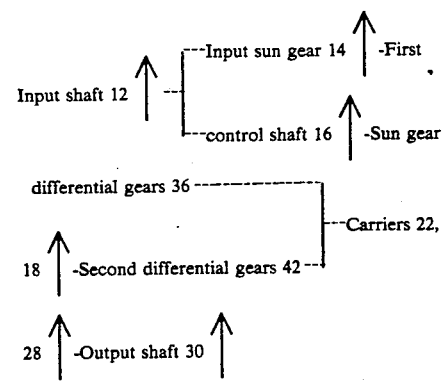

The high speed state further increases the rotational speed over the medium speed state. The brake force P2 applied to the control shaft 16 is released and the input shaft 12 and the control shaft 16 are locked together by the interlocking means 66 such that the rotational speed of the input shaft 12 and the control shaft 16 is the same.

In the high speed state, the rotational force passed through the input shaft 12 is transmitted along two paths. In the first, the rotational force is transmitted to the input sun gear 14 and the first differential gears 36 by passing through the input shaft 12 and rotating the input sun gear 14. In the second, the rotational force is transmitted to the sun gear 18 and the second differential gears 42 by rotating the control shaft 16 integrally with the input shaft 12 and at the same time rotating the sun gear 18.

The rotational forces, after passing along these two paths, are combined at the first and second carriers 22, 28 to rotate the output shaft 30. That is, since the rotational speed input to the input sun gear 14 and the sun gear 18 is the same in speed and direction, they cannot rotate the first differential gears 36 and the second differential gears 42 on their axis, but rotate the first and second carriers 22, 28 and the output shaft 30 in the same direction as the input shaft 12. In this state, all the gears and the first and second carriers 22, 28 constitute a single rotating body with the two sun gears 14, 18 as the centers to rotate in a direction J. At this time, the first differential gears 36 and the second differential gears 42 rotate together with the first and second carriers 22, 28 and do not rotate about their own axis.

Figure 7:
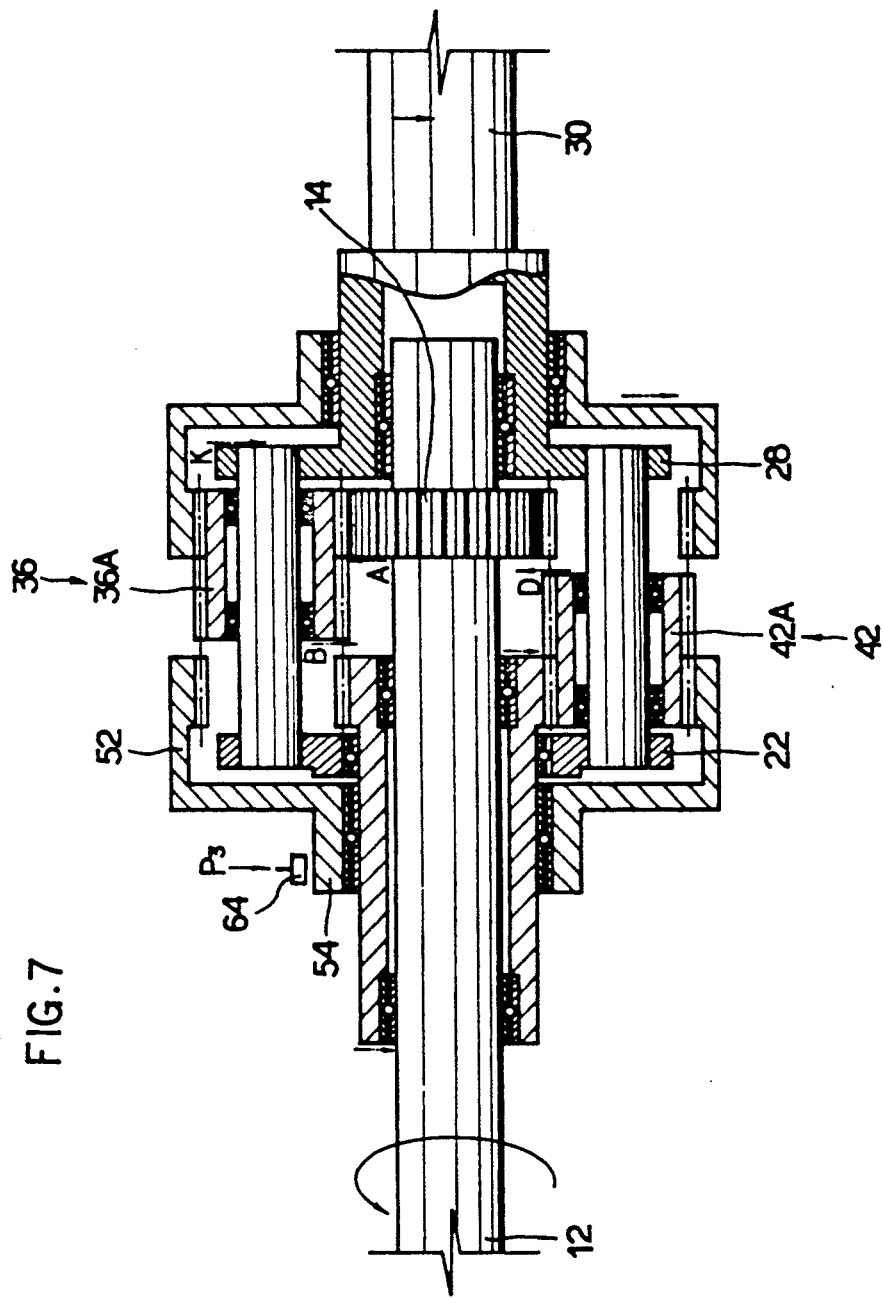

5. Reverse driving state (FIG. 7) Input shaft 12 ↑ —Input sun gear 14 ↑ —First differential gears 36 ↓ —Second differential gears 42 ↑ —Carriers 22, 28 ↓ —Output shaft 30 ↓ (opposite to the direction of the input shaft)

The reverse driving state is a state in which the output shaft 30 rotates in a direction opposite to that of the input sun gear 14. While in the neutral state, i.e. the output shaft 30 is not rotating, if a brake force P3 is applied by the reverse rotation brake means 64 installed on the tube shaft boss 54 of the reverse rotation ring gear 52, the reverse rotation ring gear 52 stops and the output shaft 30 rotates in a direction opposite to that of the input sun gear 14.

That is, as the reverse rotation ring gear 52 which has been rotating in the direction E in the neutral state stops due to the brake force P3, each second differential gear 42A rotates both on its own axis and revolves around the inner circumference of the reverse rotation ring gear 52 to rotate the first and second carriers 22, 28 in a direction K, and the output shaft 30 integrally formed with the second carrier 28 rotates in a direction opposite to that of the input shaft 12. Reviewing the direction of each gear in this state, the first differential gear 36A rotates in the direction B opposite to the rotational direction A of the input sun gear 14, the second differential gear 42A, which is meshed with the first differential gear 36A, rotates in the direction D which is the same as that of the input sun gear 14. The first and second carriers 22, 28 and the output shaft 30 rotate in the direction K opposite to that of the input shaft. The first and second differential gears rotate about their own axis and at the same time rotate together with the first and second carriers 22, 28.

Below is given a description about the second embodiment of the present invention.

In this second embodiment, the control shaft 16, the sun gear 18 and the bearings 20, 20' of the first embodiment are not required. The position of the input sun gear 14 is changed from the first embodiment, and the positions of the first and second differential gears are different than the positions of the first embodiment. Also the positions of the low speed ring gear and the reverse rotation ring gear on the input shaft are different than those of the first embodiment. In order to attain the medium and high speed rotational speeds, the interlocking means 66 can be employed which enables rotational difference between the input shaft and the low speed ring gear or which can enable joint rotation as an integrated body. Such means 66 include a friction clutch device which can slowly engage the rotating input shaft and the rotating low speed ring gear 146 and thereby slowly increase the rotational speed of the output shaft 30. Other interlocking means 66 include friction drive, belt drive, and such means well known in the art.

Figure 8:
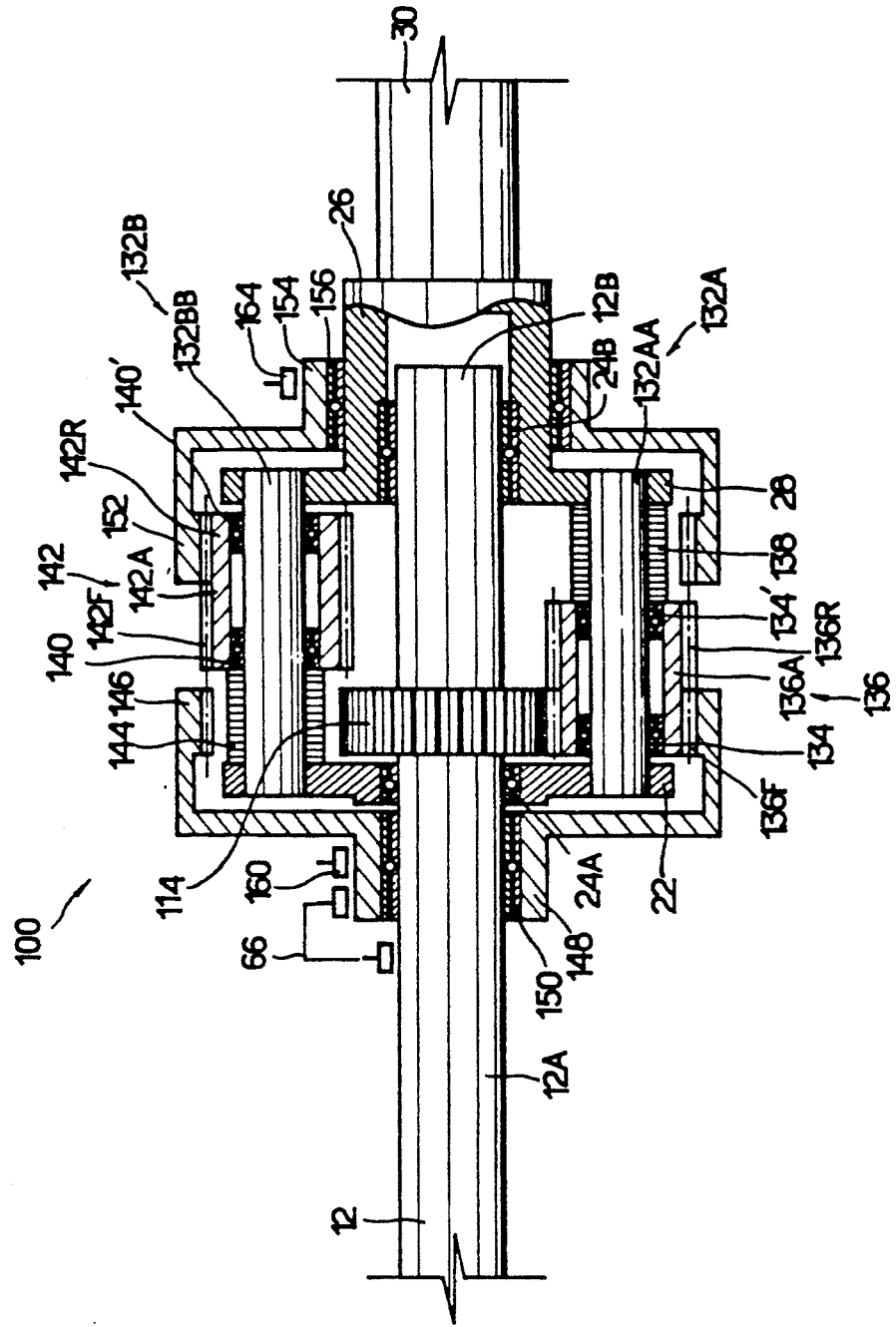
FIGS. 8-11 illustrate the second embodiment of the continuous automatic transmission of the present invention.

FIG. 8 illustrates those parts of the first embodiment which are used in the second embodiment and are given the same reference numerals for sake of simplicity.

In the continuous automatic transmission 100 of the second embodiment of the present invention, an input shaft 12 with a first section 12A and a second section 12B is used. An input sun gear 114 is integrally formed on the input shaft 12 between the first section 12A and the second section 12B.

A circular disk type first carrier 22 is rotatably installed on the first section 12A near the input sun gear 114 via a bearing 24A, and a second carrier 28 having a hollow cylindrical part 26 is rotatably installed on the second section 12B of the input shaft via a bearing 24B. The second carrier 28 terminates in an output shaft 30.

The first and second carriers 22, 28 are interconnected by a plurality of locking pins 132A, 132B which enables the carriers 22, 28 to rotate together about the input shaft 12. A plurality of first differential gears 136 are used with each first differential gear 136A rotatably installed on a locking pin 132AA via bearings 134, 134'.

The forward portion 136F of the first differential gear 136A meshes with the input sun gear 114 and with the low speed ring gear 146. The low speed ring gear 146 includes a tube shaft boss 148 and is rotatably installed on the first section 12A of the input shaft via a bearing 150. The rear portion 136R of the first differential gear 136A meshes with the forward portion 142F of the second differential gear 142A. The rear portion 142R of the second differential gear 142A meshes with the reverse rotation ring gear 152.

Each second differential gear 142A, of the plurality of second differential gears 142, is rotatably installed on a locking pin 132BB, of the plurality of locking pins 132B, via bearings 140, 140'. The reverse rotation ring gear 152 has a tube shaft boss 154 and is rotatably installed on the hollow cylindrical part 26 of the second carrier 28 using a bearing 156.

As in the first embodiment, bushings 138, 144 can be inserted to prevent the movement of the first and second differential gears along their respective locking pins.

In order to apply the necessary braking force, a low speed brake means 160 is installed on the tube shaft boss 148 of the low speed ring gear 146 and a reverse rotation brake means 164 is installed on the tube shaft boss 154 of the reverse rotation ring gear 152. The installation method of the brake means is same as that of the first embodiment.

The interlocking means 66 is used for both the medium and high speed driving, i.e. medium and high rotational speed of the output shaft 30.

The power transmission procedure and the principle of the speed variation of the second embodiment of the continuous automatic transmission of the present invention will be briefly described below.

Figure 9:
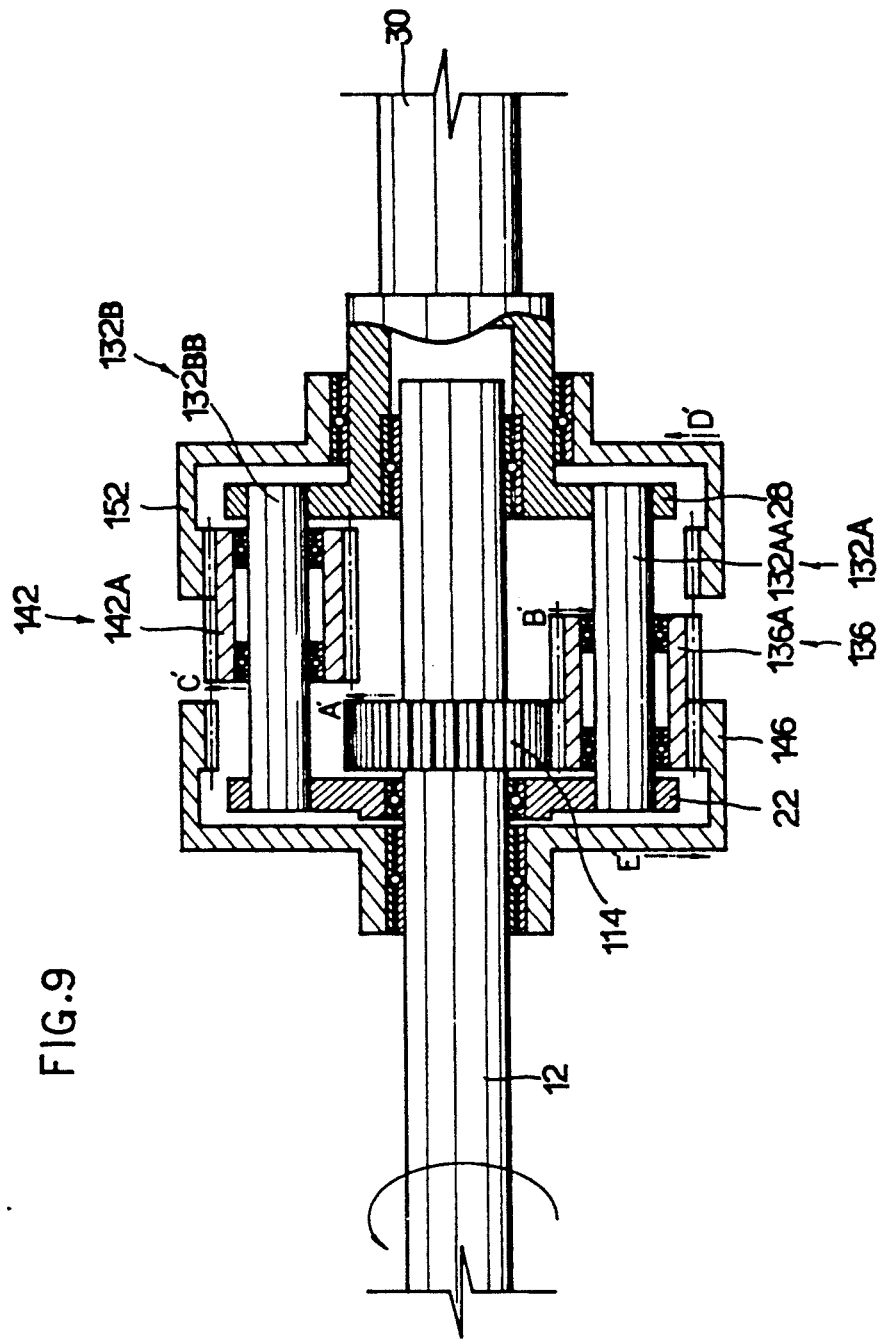

A. Neutral state (FIG. 9)

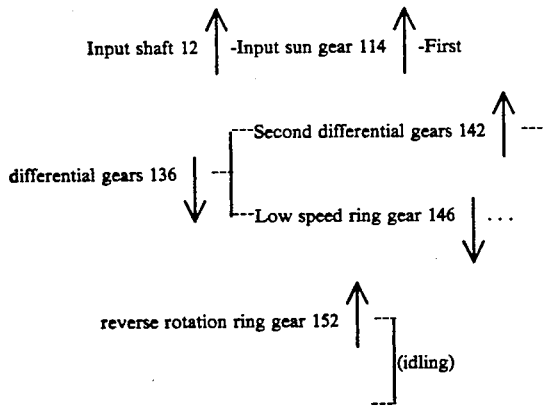

The neutral state is a state in which the rotational power of the input shaft is not transmitted to the output shaft 30, i.e. the motor which provides the rotational force is idling and rotating the input shaft with the rotational energy being spent in the transmission. FIG. 9 illustrates the input sun gear 114 rotating in a direction A' as the input shaft 12 rotates. At this time, since a load is applied to the output shaft 30 and the first and second carriers 22, 28 are in a stationary state, the first differential gear 136A which is meshed with the input sun gear 114 only rotates about the locking pin 132AA in a direction B'. The second differential gear 142A also only rotates about the locking pin 132BB in a direction C' as the first differential gear 136A rotates, therefore the reverse rotation ring gear 152 rotates in a direction D'. The low speed ring gear 146 rotates in a direction E' as the first differential gear 136A rotates.

Figure 10:
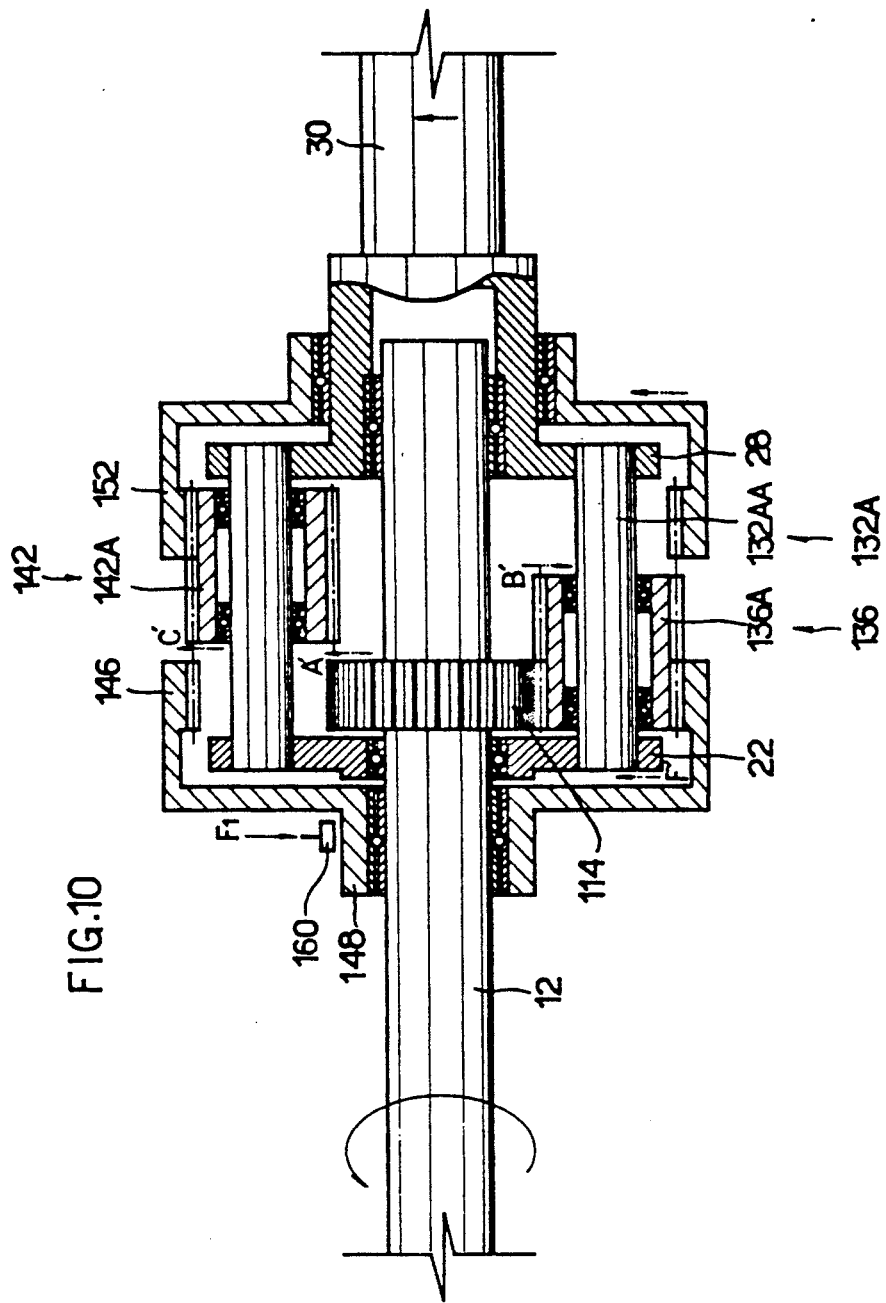

B. Low speed state (FIG. 10)

Input shaft 12 ↑ —Input sun gear 114 ↑ —First differential gears 136 ↓ —Carriers 22, 28 ↑ —Output shaft 30 ↑

If a brake force F1 is applied by the low speed brake means 160 installed on the tube shaft boss 148 of the low speed ring gear 146, the low speed ring gear 146 which has been rotating in the direction E' in the neutral state, stops. That is, when the rotation of the low speed ring gear 146 decreases and stops, the first differential gears 136 rotate about their locking pin 132AA in the direction B' and at the same time they revolve around the inside of the low speed ring gear 146. Therefore, the first and second carriers 22, 28 rotate in a direction F' and the output shaft rotates in a direction which is the same as that of the input shaft but at a lower rotational speed.

Once low speed is attained, the speed of the output shaft is increased by activating the interlocking means. That is, in order to rotate the output shaft at medium and high rotational speeds, the interlocking means 66 is used with the medium and high speeds being directly related to the rotational speed of the input shaft.

Figure 11:
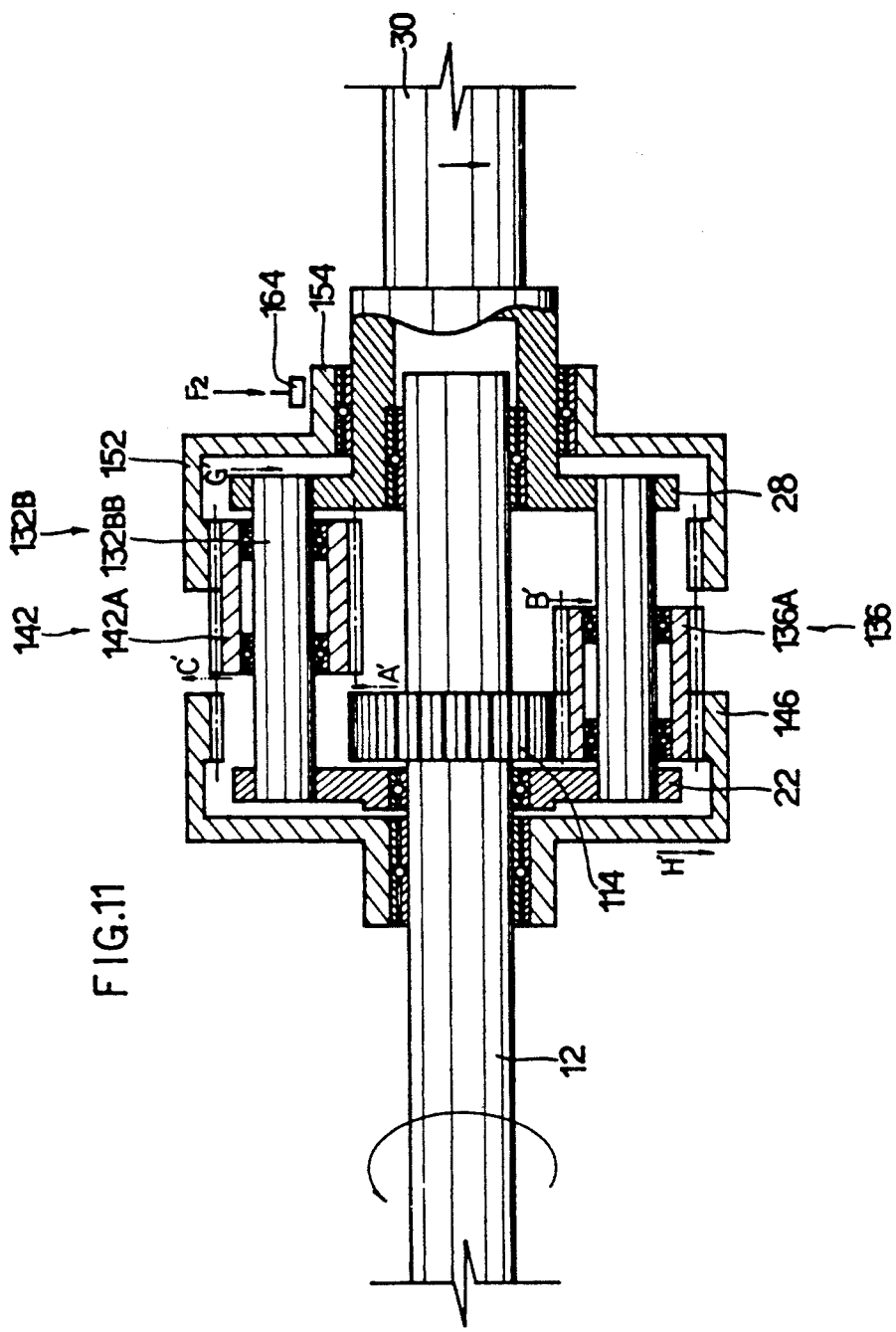

C. Reverse driving state (FIG. 11)

Input shaft 12 ↑ —Input sun gear 114 ↑ —First differential gears 136 ↓ —Second differential gears 142 ↑ —Carriers 22, 28 ↓ —Output shaft 30 ↓ (Opposite to the direction of the input shaft)

If the brake force F2 is applied by the reverse rotation brake means 164 installed on the tube shaft boss 154 of reverse rotation ring gear 152, the reverse rotation ring gear 152, which has been rotating in the direction D' in the neutral state, stops. That is, as the reverse rotation ring gear 152 stops due to the brake force F2 applied thereto, each second differential gear 142A rotates about its locking pin 132BB and at the same time revolves around the inner circumference of the reverse rotation ring gear 152. Therefore, the first and second carriers 22, 28 rotate in a direction G', and the output shaft 30, integrally formed with the second carrier 28, rotates in a direction opposite to the direction of the input shaft. At this time, the low speed ring gear 146 rotates in a direction H'.

The number of teeth on each gear of the present invention is not defined as the required output revolutions can be obtained by properly adjusting the number of teeth on each gear according to a desired purpose. For reference, an example is given below of obtaining the revolutions of the output shaft per one revolution of the input shaft when the number of teeth of each gear is described. Given the number of teeth of each gear, that is, the input sun gear 14: Ia, sun gear 18: Ma, first differential gear 36: D1, second differential gear 42: D2, low speed ring gear 46: La, reverse rotation ring gear: Ra, formulas for obtaining the revolutions of the output shaft Wp per one revolution of the input shaft are as follows.

1) when the low speed ring gear 46 is stopped $$W_p = \frac{Ia}{Ia + La}$$

2) when the sun gear 18 is stopped $$W_p = \frac{Ia}{Ia + Ma}$$

3) when the reverse rotation ring gear 52 is stopped $$W_p = \frac{Ia}{Ia - Ra}$$

Table 1 presents the number of teeth of each gear as examples, and table 2 presents the revolutions of the output shaft (per one revolution of the input shaft) according to Table 2.

TABLE 1

| | Input sun gear (14) Ia | First differential gear (36) D1 | Second differential gear (42) D2 | Sun gear (18) Ma | Low speed ring gear (46) La | Reverse rotation ring gear (52) Ra |
|---|---|---|---|---|---|---|
| 1 | 26 | 26 | 26 | 26 | 78 | 78 |
| 2 | 24 | 24 | 18 | 36 | 72 | 72 |
| 3 | 24 | 24 | 24 | 30 | 72 | 78 |
| 4 | 27 | 24 | 27 | 30 | 75 | 84 |

TABLE 2

| | Low speed ring gear (46) stops | Sun gear (18) stops | Sun gear (18) rotates 0.5 0.5 revolutions | Reverse rotation ring gear (52) stops | Reverse rotation ring gear (52) rotates 1/2 of revolutions in neutral state |
|---|---|---|---|---|---|
| 1 | 1/4 (0.25) | 1/2 (0.5) | 3/4 (0.75) | −1/2 (−0.5) | −1/4 (−0.25) |
| 2 | 1/4 (0.25) | 2/5 (0.4) | 7/10 (0.7) | −1/2 (−0.5) | −1/4 (−0.25) |
| 3 | 1/4 (0.25) | 4/9 (0.44) | 13/18 (0.72) | −4/9 (−0.44) | −4/18 (−0.22) |
| 4 | 9/34 | 9/19 | 14/19 | −9/19 | −9/38 |

TABLE 2-continued

| Low speed ring gear (46) stops | Sun gear (18) stops | Sun gear (18) rotates 0.5 0.5 revolutions | Reverse rotation ring gear (52) stops | Reverse rotation ring gear (52) rotates 1/2 of revolutions in neutral state |
|---|---|---|---|---|
| (0.2647) | (0.47) | (0.73) | (−0.47) | (−0.23) |

As described above, the continuous automatic transmission has advantages in that there is no need to install a clutch to cut the power of the engine when it is transmitted through the input shaft and output to the output shaft. Satisfactory speed adjustment is possible through the adjustment of the speed variation ratio without mechanically changing or disengaging the gears according to the present invention. Further, the rotational output can be reversed which enables both forward and backward movement when the transmission of the present invention is used in an automobile or the like. The cost of production is low because of its simple structure and the small number of parts which allows the transmission to be installed in a small space. Furthermore, its light weight make it an ideal transmission where weight is a factor such as in an electrically powered automobile.

The continuous automatic transmission of the present invention is not limited to the present embodiment, but can be applied to any device which requires a variable transmission for transmitting and outputting a rotational driving force to an output shaft for use in all vehicles and industrial machines. Also, it is obvious that various modifications and alterations can be made within the scope of the present invention.

For example, the same objects can be accomplished when the control shaft 16, sun gear 18, bearings 20, 20' and medium speed brake means 62 for medium speed driving are not utilized in the transmission with the interlocking means 66 being used to attain the medium and high speeds.

Furthermore, the number of teeth formed on the first differential gears 36 can be the same or different relative to the number of teeth formed on the second differential gears 42. Also, Each differential gear 36A, 42A may further include a forward portion and a rear portion with the forward portion having a predetermined number of teeth formed thereon and the rear portion having a predetermined number of teeth formed thereon. The number of teeth formed in the forward portion of each differential gear 36A, 42A may be different or the same relative to the number of teeth formed in the rear portion of each differential gear 36A, 42A.

A simple brake means (drum type) is used to illustrate one method for applying brake force. The position of the brake means in the figures is used to illustrate one position for placing the brake means. However, other positions and other types of brake means can be used to achieve the intended purpose, including automatic control system, such as hydraulic, pneumatic, electric and electronic control devices which may be used without departing from the spirit and scope of the invention.

Although this invention has been described in its preferred form with a certain degree of particularity, it is appreciated by those skilled in the art that the present disclosure of the preferred form has been made only by way of example and that numerous changes in the details of the construction, combination and arrangement of parts may be resorted to without departing from the spirit and scope of the invention. The reference numerals in the claims are used to more clearly illustrate the invention when considered with the figures and are not intended to limit the scope of the claims or imply that the scope of the claims is limited to the exact means so referred to by the respective numeral.

What is claimed is:

1. An automatic variable speed transmission, comprising:
   an input shaft (12) with a first section (12A) and a second section (12B) for receiving rotational input;
   an input sun gear (14) integrally formed between said first section (12A) and said second section (12B) of said input shaft to enable simultaneous rotation with said input shaft;
   a control shaft (16) having a sun gear (18) at an end (16A) and being rotatably and coaxially mounted on said first section (12A) of said input shaft to enable independent rotation about said input shaft;
   a first carrier (22) coaxially mounted on said control shaft (16) near said sun gear (18) to enable independent rotation about said control shaft (16);
   a second carrier (28) having a hollow cylinder part (26) and being coaxially mounted on said second section (12B) of said input shaft to enable independent rotation about said second section;
   a plurality of locking pins (32A), (32B) secured to and interlinking said first and second carriers (22), (28) to enable simultaneous rotation of said first and second carriers (22), (28),
   a plurality of first differential gears (36) with each said first differential gear (36A) being rotatably mounted on each said locking pin (32AA) and with the inner side of the rear portion of each said first differential gear being meshed with said input sun gear (14);
   a low speed ring gear (46) rotatably mounted on said hollow cylinder part (26) and being meshed with said first differential gear (36A);
   a plurality of second differential gears (42) with each said second differential gear (42A) being rotatably mounted on each said locking pin (32BB) and with each said second differential gear being meshed with each said first differential gear (36A) and said sun gear (18) respectively;
   a reverse ring gear (52) rotatably mounted on said control shaft (16) and being meshed with each said second differential gear (42A);
   an output shaft (30) integrally formed with said hollow cylinder part (26) of said second carrier (28);
   a low speed brake means (60) for applying a braking force to said low speed ring gear (46) to provide a low speed driving;
   a medium speed brake means (62) for applying a braking force to said control shaft (16) to provide a medium speed driving;
   an interlocking means (66) for directly coupling the rotation of said input shaft (12) to said control shaft (16) so that they rotate simultaneously to provide high speed driving; and
   a reverse rotation brake means (64) for applying a braking force to said reverse rotation ring gear (52) to provide a reverse driving.

2. The automatic variable speed transmission of claim 1, wherein the number of teeth of forward portion of each said differential gear (36A), (42A) are different from those of rear portion thereof.

3. The automatic variable speed transmission of claim 1, wherein the number of teeth of forward portion of each said differential gear (36A), (42A) are the same as those of rear portion thereof.

4. An automatic variable speed transmission, comprising:
- an input shaft (12) with a first section (12A) and a second section (12B) for receiving rotational input;
- an input sun gear (14) integrally formed between said first section (12A) and said second section (12B) of said input shaft to enable simultaneous rotation with said input shaft;
- a first carrier (22) coaxially mounted on said first section (12A) of said input shaft to enable independent rotation about said input shaft (12);
- a second carrier (28) having a hollow cylinder part (26) and being coaxially mounted said second section (12B) of said input shaft to enable independent rotation about said second section;
- a plurality of locking pins (32A), (32B) secured to and interlinking said first and second carriers (22), (28) to enable simultaneous rotation of said first and second carriers (22), (28);
- a plurality of first differential gears (36) with each said first differential gear (36A) being rotatably mounted on each said locking pin (32AA) and with each said first differential gear (36A) being meshed with said input sun gear (14);
- a low speed ring gear (46) rotatably mounted on said hollow cylinder part (26) and being meshed with each said first differential gear (36A);
- a plurality of second differential gears (42) with each said second differential gear (42A) being rotatably mounted on each said locking pin (32BB) and with each said second differential gear being meshed with each said first differential gear (36A);
- a reverse rotation ring gear (52) rotatably mounted on said first section (12A) of said input shaft and being meshed with each said second differential gear (42A);
- an output shaft (30) integrally formed with said hollow cylinder part (26) of said second carrier (28);
- a low speed brake means (60) for applying a braking force to said low speed ring gear (46) to provide a forward driving;
- an interlocking means (66) for directly coupling the rotation of said input shaft (12) to said reverse gear (52) so that they have a difference in rotation between them or they rotate simultaneously to provide a medium and a high speed driving; and
- a reverse rotation brake means (64) for applying a braking force to said reverse rotation ring gear (52) to provide a reverse driving.

5. An automatic variable speed transmission, comprising:
- an input shaft (12) with a first section (12A) and a second section (12B) for receiving rotational input;
- an input sun gear (114) integrally formed between said first section (12A) and said second section (12B) of said input shaft to enable simultaneous rotation with said input shaft;
- a first carrier (22) coaxially mounted on said first section (12A) of said input shaft near said input shaft near said input sun gear (114) to enable independent rotation about said input shaft (12);
- a second carrier (28) having a hollow cylinder part (26) and being coaxially mounted on said second section (12B) of said input shaft to enable independent rotation about said second section;
- a plurality of locking pins (132A), (132B) secured to and interlinking said first and second carriers (22), (28) to enable simultaneous rotation of said first and second carriers (22), (28);
- a plurality of first differential gears (136) with each said first differential gear (136A) being rotatably mounted on each said locking pin (132AA) and with each said first differential gear (136A) being meshed with said input sun gear (114);
- a low speed ring gear (146) rotatably mounted on said first section (12A) of said input shaft and being meshed with each said first differential gear (136);
- a plurality of second differential gears (142) with each said second differential gear (142A) being rotatably mounted on each said locking pin (132BB) and with each said second differential gear (142A) being meshed with each said first differential gear (136A);
- a reverse rotation ring gear (152) rotatably mounted on said hollow cylinder part (26) of said second carrier (28) and being meshed with each said second differential gear (142A);
- an output shaft (30) integrally formed with said hollow cylinder part (26) of said second carrier (28);
- a low speed brake means (160) for applying a braking force to said low speed ring gear (146) to provide a forward driving;
- an interlocking means (66) for directly coupling the rotation of said input shaft (12) to said low speed ring gear (146) so that they have a difference in rotation between them or they rotate simultaneously to provide a medium and a high speed driving; and
- a reverse rotation brake means (164) for applying a braking force to said reverse rotation ring gear (152) to provide a reverse driving.

6. An automatically variable transmission (10) comprising:
- an input shaft (12) having a first section (12A) and a second section (12B) for receiving rotational driving force;
- an input sun gear (14) is mounted on said input shaft (12) proximate said second section (12B);
- a hollow control shaft (16) coaxially and rotatably positioned on said input shaft (12) and having a first end (16A) and a second end (16B);
- a sun gear (18) positioned at said first end (16A) of said control shaft (16);
- a first carrier (22) coaxially and rotatably mounted on said control shaft (16) proximate said sun gear (18);
- a second carrier (28) coaxially and rotatably mounted on said input shaft with said second carrier (28) terminating in an output shaft (30);
- a plurality of first locking pins (32A) and a plurality of second locking pins (32B) with each locking pin secured to and interconnecting said carriers (22), (28) such that, in use, said carriers (22), (28) simultaneously rotate about said hollow control shaft (16) and said input shaft (12), respectively;
- a low speed ring gear (46) rotatably mounted on said output shaft (30);
- a plurality of first differential gears (36) with each said first differential gear being rotatably mounted on a first locking pin (32AA) of said plurality of first locking pins (32A) with each said first differential gear (36A) being in mechanical communication with said input sun gear (14) and said low speed ring gear (46);

a reverse rotation ring gear (52) rotatably mounted on said hollow control shaft (16);

a plurality of second differential gears (42) with each said second differential gear being rotatably mounted on a second locking pin (32BB) of said plurality of second locking pins (32B) and with each said second differential gear (42A) being in mechanical communication with said reverse rotation ring gear (52), said sun gear (18) and with a first differential gear of said plurality of first differential gears;

a low speed brake means (60) for applying in use rotational resistance to said low speed ring gear (46) sufficient to stop said low speed ring gear (46) from rotation such that said output shaft (3) rotates at a low speed;

a medium speed brake means (62) for applying in use rotational resistance to said control shaft (16) sufficient to stop said control shaft (16) from rotation such that said output shaft (30) rotates at a medium speed; and an interlocking means (66) for locking together said input shaft (12) and said hollow control shaft (16) to enable in use said output shaft and said input shaft rotate at the same speed.

7. The automatically variable transmission (10) of claim 6 further including a reverse rotation brake means (64) for applying in use rotational resistance to said reverse rotation ring gear (52) sufficient to stop said reverse rotation ring gear (52) from rotation such that said output shaft rotates in a rotational direction opposite to that of said input shaft.

8. The automatically variable transmission of claim 6 wherein said low speed brake means (60) provides in use, upon activation, a gradual application of rotational resistance to said low speed ring gear (46) sufficient to initiate rotation of said output shaft (30) and upon further activation of said low speed brake means (60) rotational resistance on said low speed ring gear is increased such that said low speed ring gear stops rotating and said output shaft (30) rotates at said low speed.

9. The automatically variable transmission of claim 6, wherein each said differential gear (36), (42) includes a forward portion and a rear portion with said forward portion having a predetermined number of teeth formed thereon and said rear portion having a predetermined number of teeth formed thereon wherein said number of teeth formed in said forward portion of each said differential gear (36), (42) is different relative to said number of teeth formed in said rear portion of each said differential gear (36), (42).

10. The automatically variable transmission of claim 6, wherein each said differential gear (36), (42) includes a forward portion and a rear portion with said forward portion having a predetermined number of teeth formed thereon and said rear portion having a predetermined number of teeth formed thereon wherein said number of teeth formed in said forward portion of each said differential gear (36), (42) is equal to said number of teeth formed in said rear portion of each said differential gear (36), (42).

11. An automatically variable transmission (10) comprising:

an input shaft (12) having a first section (12A) and a second section (12B) for receiving rotational driving force;

an input sun gear (14) is mounted on said input shaft (12) proximate said second section (12B);

a hollow control shaft (16) coaxially and rotatably positioned on said input shaft (12) and having a first end (16A) and a second end (16B);

a sun gear (18) positioned at said first end (16A) of said control shaft (16);

a first carrier (22) coaxially and rotatably mounted on said control shaft (16) proximate said sun gear (18);

a second carrier (28) coaxially and rotatably mounted on said input shaft with said second carrier (28) terminating in an output shaft (30);

a plurality of first locking pins (32A) and a plurality of second locking pins (32B) with each locking pin secured to and interconnecting said carriers (22), (28) such that, in use, said carriers (22), (28) simultaneously rotate about said hollow control shaft (16) and said input shaft (12), respectively;

a low speed ring gear (46) rotatably mounted on said output shaft (30);

a plurality of first differential gears (36) with each said first differential gear being rotatably mounted on a first locking pin (32AA) of said plurality of first locking pins (32A) with each said first differential gear (36A) being in mechanical communication with said input sun gear (14) and low speed ring gear (46);

a reverse rotation ring gear (52) rotatably mounted on said hollow control shaft (16);

a plurality of second differential gears (42) with each said second differential gear being rotatably mounted on a second locking pin (32BB) of said plurality of second locking pins (32B) and with each said second differential gear (42A) being in mechanical communication with said reverse rotation ring gear (52), said sun gear (18) and with a first differential gear of said plurality of first differential gears;

a low speed brake means (60) for applying in use rotational resistance to said low speed ring gear (46) sufficient to stop said low speed ring gear (46) from rotation such that said output shaft (30) rotates at a low speed;

a medium speed brake means (62) for applying in use rotational resistance to said control shaft (16) sufficient to stop said control shaft (16) from rotation such that said output shaft (30) rotates at a medium speed;

a reverse rotation brake means (64) for applying in use rotational resistance to said reverse rotation ring gear (52) sufficient to stop said reverse rotation ring gear (52) from rotation such that said output shaft rotates in a rotational direction opposite to that of said input shaft; and an interlocking means (66) for locking together said input shaft (12) and said hollow control shaft rotate at the same speed.

12. The automatically variable transmission of claim 11, wherein each said differential gear (36A), (42A) includes a forward portion (36F), (42F) and a rear portion (36R), (42R) with each said forward portion having a predetermined number of teeth formed thereon and each said rear portion having a predetermined number of teeth formed thereon wherein said number of teeth formed in each said forward portion of each said differential gear (36A), (42A) is different relative to said number of teeth formed in each said rear portion of each said differential gear (36A), (42A).

13. The automatically variable transmission of claim 11, wherein each said differential gear (36A), (42A) includes a forward portion (36F), (42F) and a rear portion (36R), (42R) with each said forward portion having a predetermined number of teeth formed thereon and each said rear portion having a predetermined number of teeth formed thereon wherein said number of teeth formed in each said forward portion of each said differential gear (36A), (42A) is equal to said number of teeth formed in each said rear portion of each said differential gear (36A), (42A).

14. The automatic transmission of claim 11 wherein said low speed brake means (60) provides in use, upon activation, a gradual application of rotational resistance to said low speed ring gear (46) sufficient to initiate rotation of said output shaft (30) and upon further activation of said low speed brake means (60) rotational resistance on said low speed ring gear is increased such that said low speed ring gear stops rotating and said output shaft (30) rotates at said low speed.

15. An automatically variable transmission (10) comprising:

an input shaft (12) for receiving rotational driving force;

an input sun gear (114) mounted on said input shaft (12);

a first carrier (22) coaxially and rotatably mounted on said input shaft (12);

a second carrier (28) coaxially and rotatably mounted on said input shaft with said second carrier (28) terminating in an output shaft (30);

a plurality of first locking pins (132A) and a plurality of second locking pins (132B) with each locking pin secured to and interconnecting said first and second carriers (22), (28), respectively, such that, in use, said carriers (22), (28), simultaneously rotate about said input shaft (12);

a low speed ring gear (146) rotatably mounted on said input shaft (12);

a plurality of first differential gears (36) with each said first differential gear being rotatably mounted on a first locking pin (132AA) of said plurality of first locking pins (132A) with each said first differential gear (136A) being in mechanical communication with said input sun gear (114) and said low speed ring gear (146);

a reverse rotation ring gear (152) rotatably mounted on said output shaft (30);

a plurality of second differential gears (142) with each said second differential gear (142A) being rotatably mounted on a second locking pin (132BB) of said plurality of second locking pins (132B) and with each said second differential gear (142A) being in mechanical communication with said reverse ring gear (152) and with a first differential gear (136A) of said plurality of first differential gears (136);

a low speed brake means (160) for applying in use rotational resistance to said low speed ring gear (146) sufficient to stop said low speed ring gear (146) from rotation such that said output shaft (30) rotates at a low speed;

a reverse rotation brake means (164) for applying in use rotational resistance to said reverse rotation ring gear (152) sufficient to stop said reverse rotation ring gear (152) from rotation such that said output shaft rotates in a rotational direction opposite to that of said input shaft; and an interlocking means (66) for locking together said input shaft (12) and said low speed ring gear (146) to enable in use said output shaft and said input shaft rotate at the same speed.

16. The automatically variable transmission of claim (15) wherein said low speed brake means (160) provides in use, upon activation, a gradual application of rotational resistance to said low speed ring gear (146) sufficient to initiate rotation of said output shaft (30) and upon further activation of said low speed brake means (160) rotational resistance on said low speed ring gear is increased such that said low speed ring gear stops rotating and said output shaft (30) rotates at said low speed.

17. The automatically variable transmission of claim (15), wherein each said differential gear (136A), (142A) includes a forward portion (136F), (142F) and a rear portion (136R), (142R) with each said forward portion having a predetermined number of teeth formed thereon and each said rear portion having a predetermined number of teeth formed thereon wherein said number of teeth formed in each said forward portion of each said differential gear (136A), (142A) is different relative to said number of teeth formed in each said rear portion of each said differential gear (136A), (142A).

18. The automatically variable transmission of claim 15, wherein each said differential gear (136A), (142A) includes a forward portion (136F), (142F) and a rear portion (136R), (142R) with each said forward portion having a predetermined number of teeth formed thereon and each said rear portion having a predetermined number of teeth formed thereon wherein said number of teeth formed in each said forward portion of each said differential gear (136A), (142A) is equal to said number of teeth formed in each said rear portion of each said differential gear (136A), (142A).

* * * * *